(12) United States Patent
Rollins et al.

(10) Patent No.: US 7,906,067 B1
(45) Date of Patent: Mar. 15, 2011

(54) METHOD FOR MAKING A SPILL-PROOF LID

(76) Inventors: Robert R. Rollins, Abington, MA (US); Colin P. Cudmore, Marshfield, MA (US)

( * ) Notice: Subject to any disclaimer, the term of this patent is extended or adjusted under 35 U.S.C. 154(b) by 684 days.

(21) Appl. No.: 12/006,746

(22) Filed: Jan. 4, 2008

Related U.S. Application Data

(60) Provisional application No. 60/878,833, filed on Jan. 4, 2007.

(51) Int. Cl.
| | |
|---|---|
| *B29C 43/02* | (2006.01) |
| *B29C 51/02* | (2006.01) |
| *B29C 51/10* | (2006.01) |
| *B29C 51/18* | (2006.01) |
| *B29C 51/30* | (2006.01) |
| *B29C 51/32* | (2006.01) |
| *B65D 47/04* | (2006.01) |
| *B65D 43/02* | (2006.01) |
| *B65D 43/08* | (2006.01) |

(52) U.S. Cl. .................................................... 264/554
(58) Field of Classification Search ................... 264/554
See application file for complete search history.

(56) References Cited

U.S. PATENT DOCUMENTS

| | | | | | |
|---|---|---|---|---|---|
| 3,860,162 | A | * | 1/1975 | Schutz | 220/711 |
| 3,952,910 | A | * | 4/1976 | Wheeler | 220/711 |

* cited by examiner

*Primary Examiner* — Richard Crispino
*Assistant Examiner* — Patrick Butler
(74) *Attorney, Agent, or Firm* — John P. McGonagle

(57) ABSTRACT

Providing a drinking lid with an under-lap between a valve base and a lid body. The valve is created with an "L" shaped exterior step around the valve side wall adjacent the wall bottom. A coining die stamps the L-shaped step producing a smooth side wall and forcing excess plastic material under a die-cut at the wall bottom creating a flange which under-laps the lid body.

6 Claims, 6 Drawing Sheets

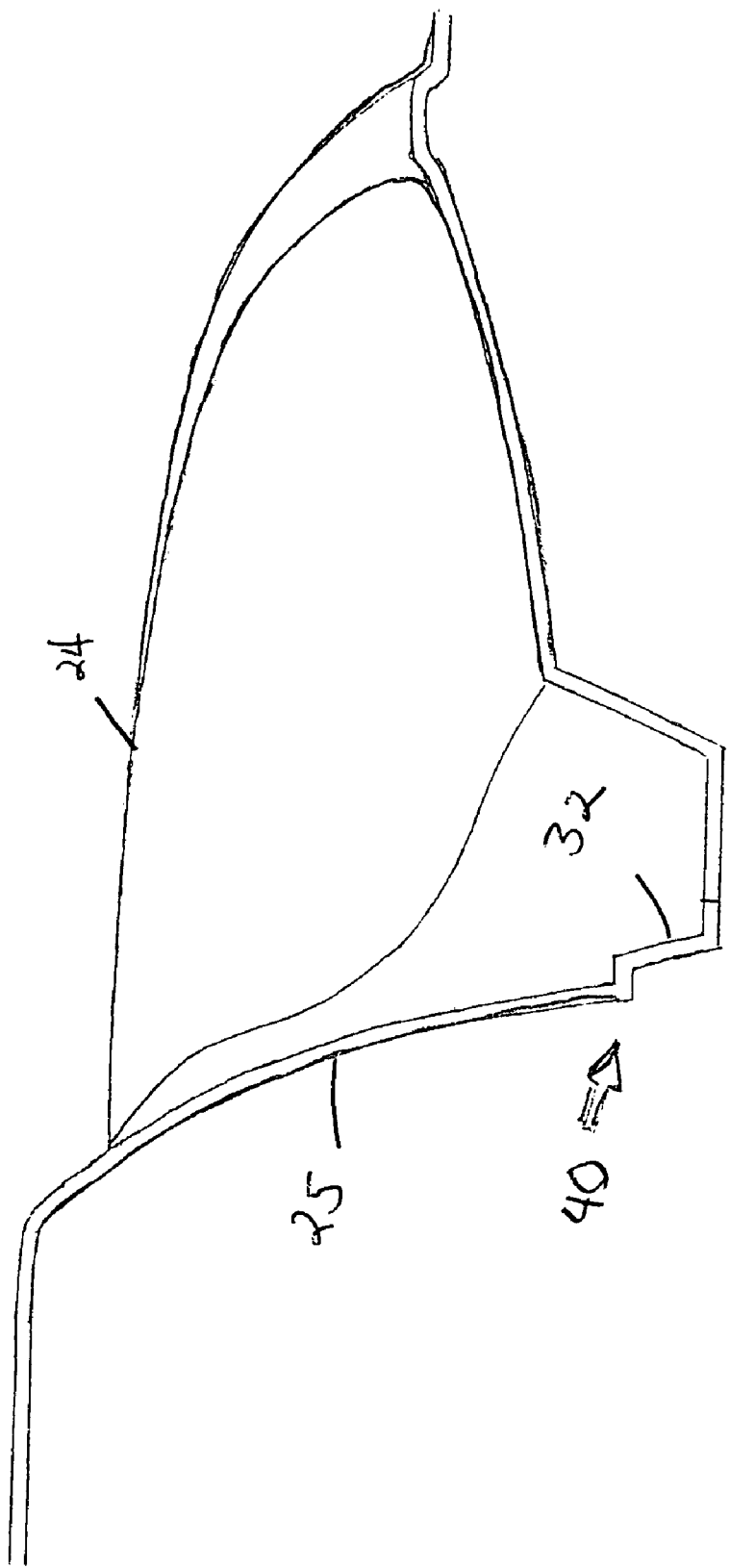

METHOD FOR MAKING A SPILL-PROOF LID

CROSS-REFERENCE TO RELATED APPLICATIONS

Applicants claim the priority benefits of U.S. Provisional Patent Application No. 60/878,833, filed Jan. 4, 2007.

BACKGROUND OF THE INVENTION

This invention relates to a self-closing lid for a beverage container which enables one to drink from the container without removing the cover or portion thereof and which prevents spilling of any of the liquid from the container and, in particular, to a method for making such a lid.

There are many different types of lids for beverage containers, especially for disposable beverage cups. However, when the cup is toppled or tipped, even slightly, the liquid inside will spill out. One of the worst types of disposable lids is the lid having a perforated section which is peeled open and then removed, leaving a gaping hole in the cover thus having nothing to prevent spillage.

Other types of disposable lids attempt to overcome the limitations of the above type disposable lid by providing a tongue or depressible portion which is depressed by a person's lips creating an opening for the beverage to be dispensed around the depressed tongue or depressed portion. Many of these lids have a horizontal flap hinged to a flat surface. The hinges do not always work, i.e., the flaps may not automatically close, nor is there a tight seal between the flap and the flat surface of the lids. Thus, there may be some spillage of the beverage from the opening.

SUMMARY OF THE INVENTION

The present invention is directed to a method of making a drinking lid for a container which overcomes the limitations of the prior art. The drinking lid is both simple in construction and contains a valve which may be opened by the engagement of a lip of a person drinking from the container. The drinking lid remains closed until the drinker depresses a valve to dispense a beverage. Once the drinker has finished taking a drink, the valve will automatically close, thus preventing any spillage of the contents of the container. Additionally, the lid includes a containment area and moat to collect and hold any liquid which passes through the open valve but which the drinker does not consume.

The lid is provided with an under-lap between a valve base and a lid body to prevent the beverage from splashing out when not drinking. To the best of applicants knowledge, prior art manufacturing processes do not provide a method for creating a lid which creates pressure against the under-lap or seal to hold the under-lap with sufficient force to keep the beverage from splashing out. Applicants have overcome the limitations of the prior art by including a "coining operation" within their method which produces a lid with sufficient pressure against the lid under-lap to prevent a beverage from splashing out of the container through the lid when not drinking.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 5 is a cross-sectional view of the tongue prior to the coining operation.

DETAILED DESCRIPTION OF THE INVENTION

Figure 1:
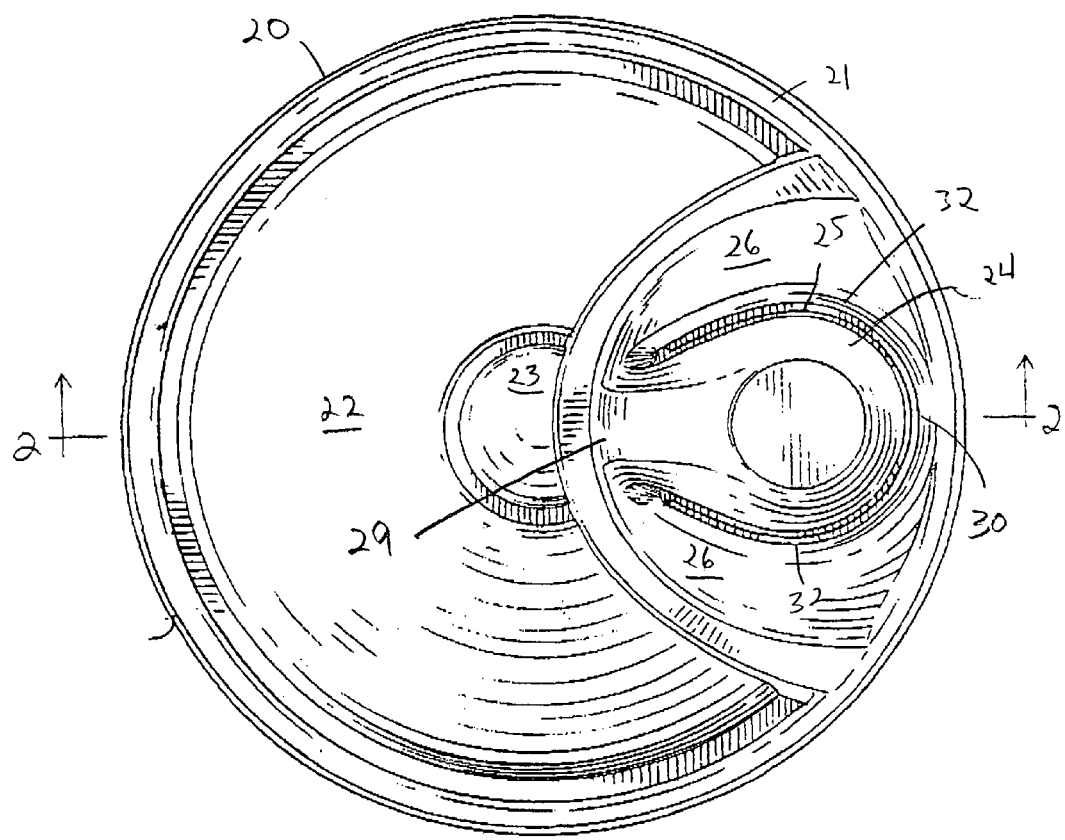
FIG. 1 is a top view of a spill-proof beverage lid in accordance with the present invention.
Figure 2:
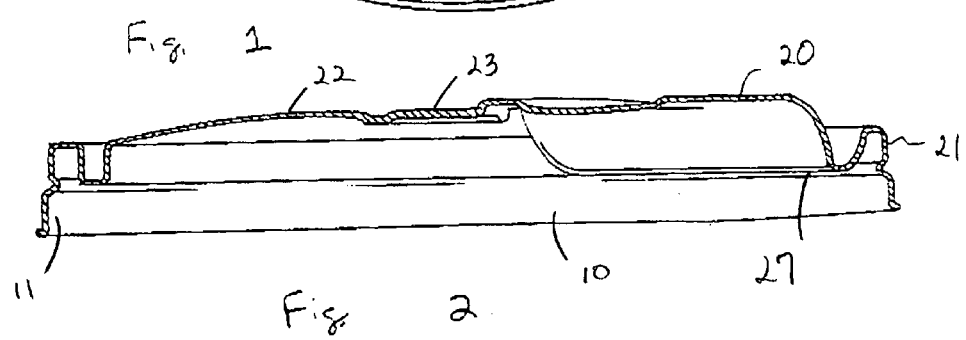
FIG. 2 is a sectional view along the line 2-2 of FIG. 1.

Referring to the drawings in detail wherein like elements are indicated by like numerals, there is shown a spill-proof lid made according to the method of the present invention. The lid 20 has an annular rim 21 adapted for detachably receiving a lip 11 of a container or cup 10 in order to maintain the lid 10 on the container 10. The lid 20 has a substantially planar central platform 22 extending from the center 23 of the lid 20 to the periphery of the annular rim 21.

The lid 20 has a raised tongue-like valve 24 which is depressible by the drinker's upper lip. Pressure is applied to the valve 24 by engaging an upper lip to the valve 24 and depressing the valve 24 thus allowing the beverage to pass through the lid 20. Once the person's lip is disengaged or removed from the valve 24, the valve 24 returns to its original position, thus closing any means of the liquid from passing through the lid 20. The valve 24 flexes without the existence of a hinge. The side walls 25 of the valve 24 are substantially vertical thus increasing the strength of the valve 24.

The valve 24 is raised higher than the majority of the lid planar central platform 22. Around the valve base 32 is a moat or containment area 26 to hold any liquid which passes through the valve opening 27 but which is not consumed by the drinker. The configuration of the containment area 26 allows the area to flex outward allowing the valve 24 to move downwardly when pressure is applied. The containment area 26 is lower than the lid planar central platform 22 except adjacent to the annular rim 21. Without the containment area 26, the liquid would flow over the entire surface of the lid 20.

The purpose of the method of the present invention is to produce a splash-proof, thin plastic, disposable, press-on, drink-cup lid 20 that features a pre-tensioned, one-way valve 24 with a "U" shaped, under-lapping flange 28. Liquid is permitted to flow from the container 10 through the lid valve 24 only when the valve 24 is depressed by a drinker's top lip when the cup 10 is raised to the drinker's lips and tipped forward to pour the cup's contents into the drinker's mouth. The valve 24 is a raised, tongue-like protuberance which is integrally molded into the lid 20 and is cantilevered at its back 29 from the shape-reinforced lid planar central platform 22 out to the valve's tip 30 (the part which is depressed by the drinker's top lip) near the lid annular rim 21 and is separated from its surround by a similarly contoured moat or containment area 26 which is die-cut along the valve base 32 of the valve perimeter.

The lid 20 is vacuum or pressure formed from polystyrene plastic or a similar material. In a first step, a plastic sheet with a material thickness in the range of 0.15-0.35 inches is heated and sucked down into a first lid mold to create the basic lid part. The molded sheet is then removed from the first mold and positioned on a first base tool. A steel-ruled first die then stamps the molded sheet on the first base tool cutting a lid perimeter as well as a tongue-valve area. The valve 24 is created with an "L" shaped step 40 around the bottom 32 of the exterior portion of the valve side walls 25.

The stamped and cut lid is then positioned on a second base tool. A coining second die then stamps the L-shaped step producing a smooth side wall and forcing the excess plastic material under the die-cut at the bottom 32 of the containment area 26 creating an under-lapping flange 28.

The purpose of the coining operation is twofold. First, the coining operation is designed to create an under-lapping flange 28 between the tongue base 32 and the lid body. This prevents the beverage from splashing out when not drinking. Second, the coining operation is designed to make a lid which creates pressure against the under-lap or seal, which in turn holds the under-lapping flange 28 with sufficient force to keep the beverage from splashing out.

The coining tool compresses downward against the valve base 32 in the containment area 26. On its way down the coining tool catches the step 40 molded into the valve at the valve base. Because the cutting die or blade has already cut the valve 24 from the surrounding lid body, the coining tool compresses and expands the step outwardly, creating a shelf or under-lapping flange 28 that expands outwardly beyond and under the die cut of the lid body dimensions.

The compression and expansion of the step 40, which created the new shelf or under-lapping 28, holds the valve 24 at a new lower position than originally molded. The holding of the valve at this new lower position reacts against the inherent memory of the plastic, which wants to pull the tongue valve back to its original molded position. The result of the above is to create pressure on the under-lapping flange 28, thus creating a sufficiently tight seal between the two pieces of plastic to keep the beverage from splashing out.

Figure 3:
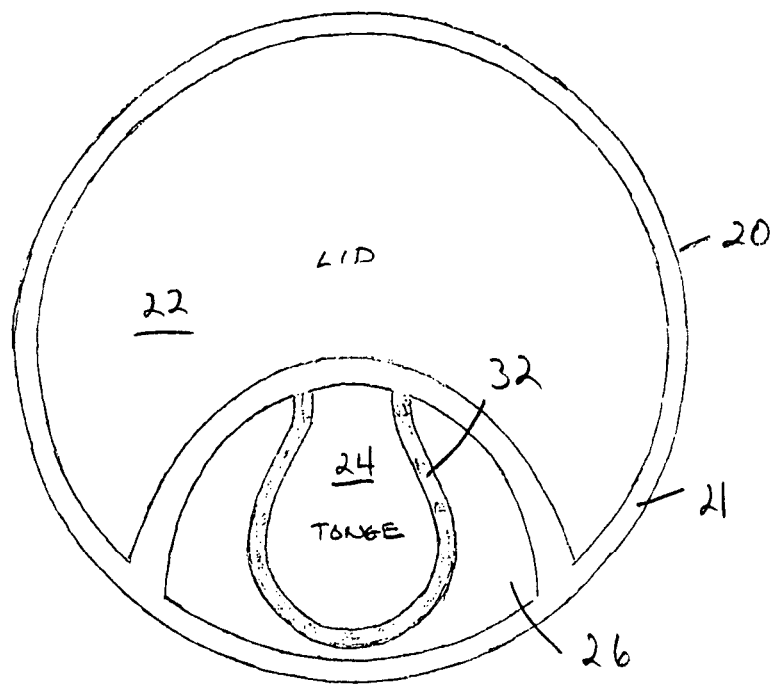
FIG. 3 is a diagrammic view of the base of the tongue and moat.
Figure 4:
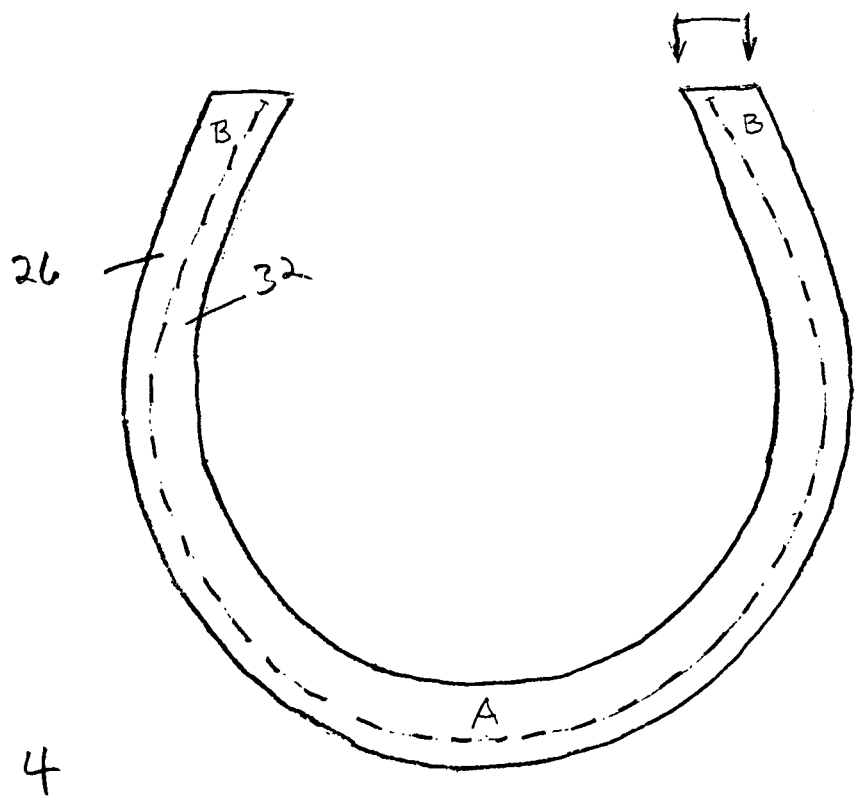
FIG. 4 is a close up view of the tongue and moat of FIG. 3.
Figure 7:
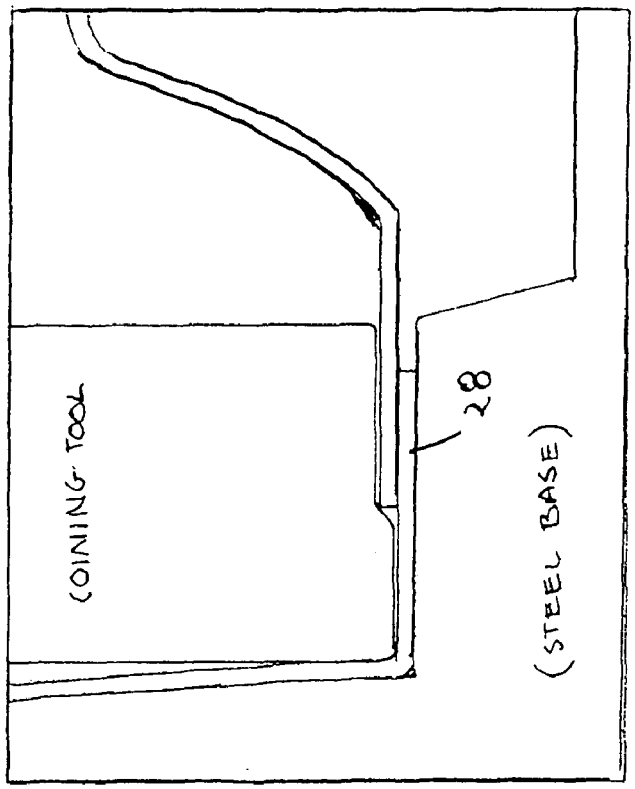
FIG. 7 is the view of FIG. 6 after the coining operation.
Figure 6:
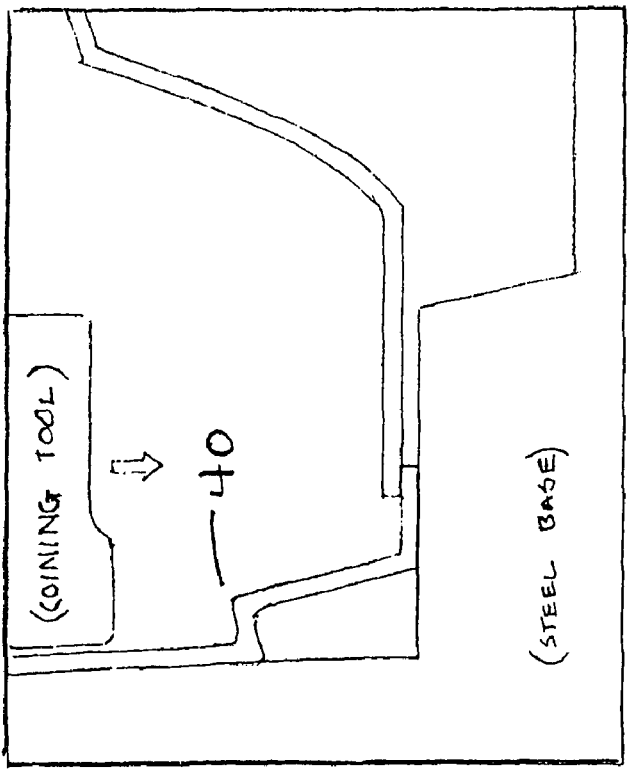
FIG. 6 is an enlarged view of FIG. 5 in the tool making apparatus.
Figure 8:
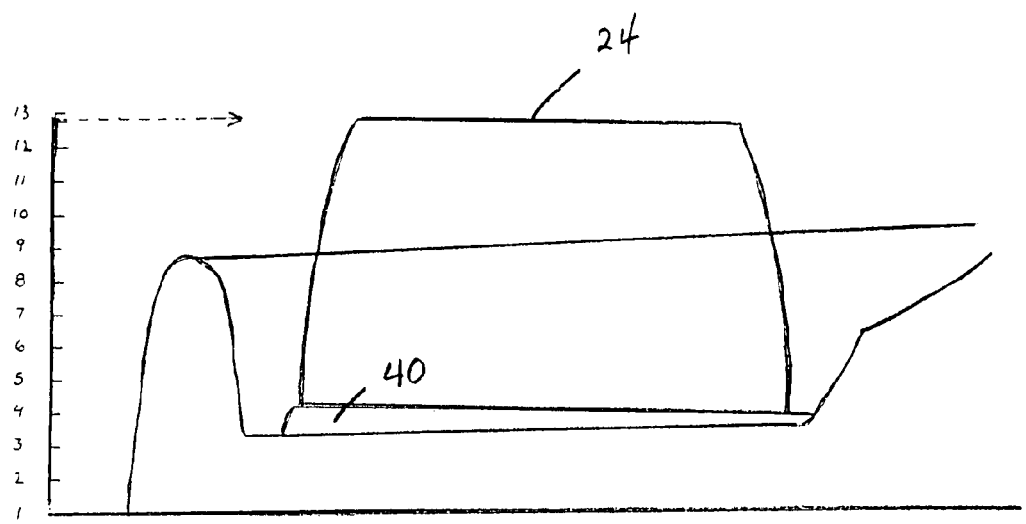
FIG. 8 is a cross-sectional view of the lid before the coining operation.
Figure 9:
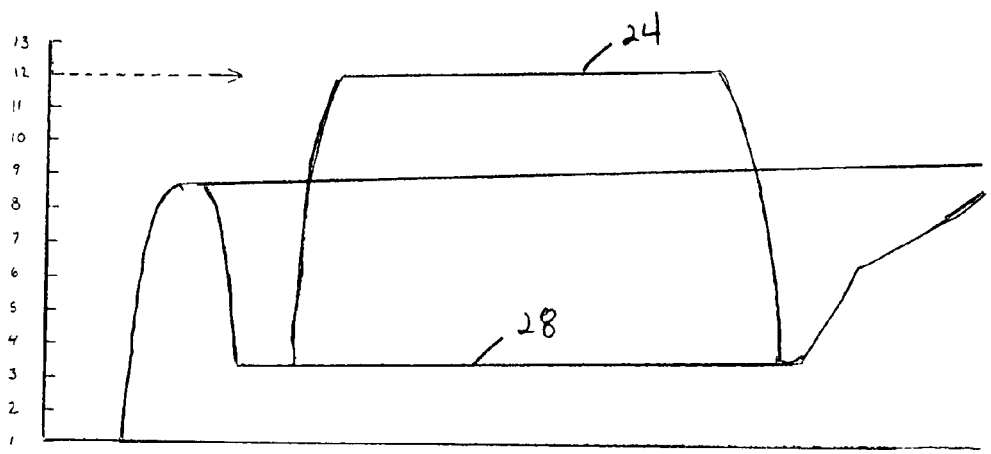
FIG. 9 is a cross-sectional view of the lid after the coining operation.

Referring to FIGS. 3 and 4, there is shown the lid containment area 26. FIG. 4 illustrates the valve base portion 32 of the containment area 26 where the coining operation is actually applied. FIG. 5 is a cross-section of the valve 24 showing the step 40 at the valve base 32. The coining tool is applied to the portion of the moat marked "A". The portion of the moat designed with "B" is not coined. FIG. 6 shows the coining tool set up for application to the lid resting on the steel base. FIG. 7 shows the results of the coining operation and the creation of the under-lapping flange 28. FIGS. 8 and 9 show the lid in cross-section through the center of the lid. FIG. 8 illustrates the "L" shaped step 40 before the coining operation and FIG. 9 illustrates the resulting lid after the coining operation. As may be best seen from FIG. 9, the valve 24 is now lower than prior to the coining operation, and is held in place by the under-lapping flange 28 created by the coining operation.

Figure 10:
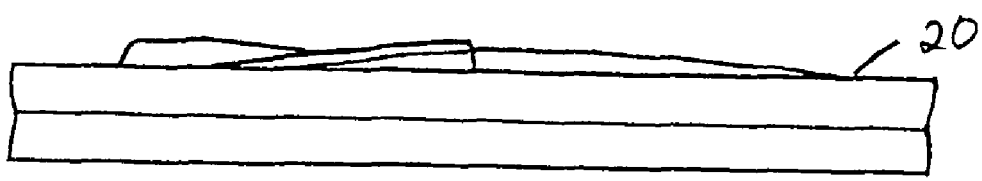
FIG. 10 is a side view of the lid without curvature.
Figure 11:
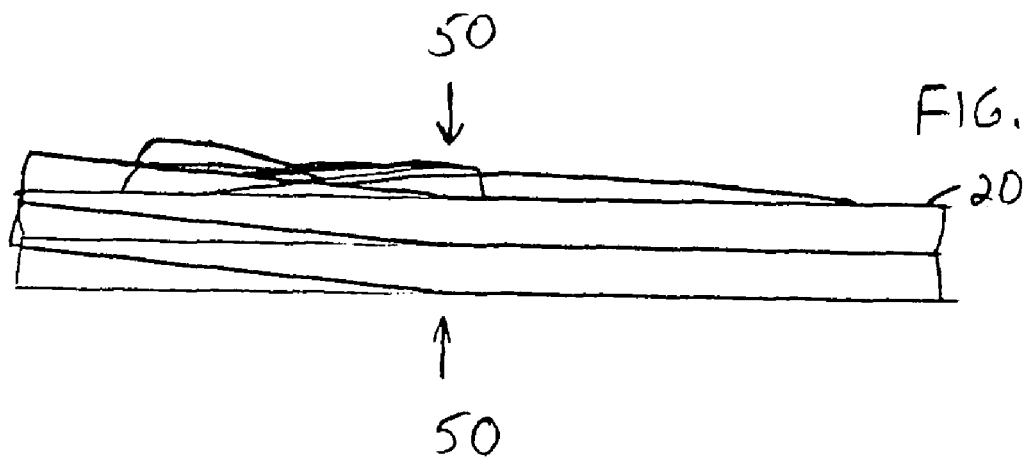
FIG. 11 is a side view of the lid after curvature.

To create additional pressure against the under-lapping flange 28 or seal in order to keep the beverage from splashing out, the lid is molded with an upward curve of the rim at the front of the tongue area, at approximately 2 to 3 degrees. When the lid is attached to the cup, the rim is forced down onto the cup, bending it down from its original molded bend or pivot point. As the lid is connected at all points to the rim of the cup, it is now held in a flat plane throughout. This bending of the lid creates additional downward pressure on the tongue seal to stay tight and helps to prevent the beverage from splashing out. Specifically, the lid is molded so as to be warped with a slight concave curve aligned with the tongue's longitudinal axis of several degrees. The result is that when the lid is firmly seated on the cup's rim, thereby unwarping the lid, the tension produced by the lid's unwarping creates upward compression of the "U" shaped under-lapping flange against the over-lapping body of the lid. The compression of the cantilevered tongue-valve exerts upward pressure on the valve's under-lapping flange sufficient to keep fluids from splashing out unless the tongue-valve is externally depressed. FIG. 10 illustrates what the lid 20 would look like without an upward curve as typical of all other disposable cup lids. FIG. 10 also illustrates the lid after being applied to a cup. FIG. 11 illustrates the lid with a curve beginning at the point 50. The curvature is greatly exaggerated for exposition purposes.

It is understood that the above-described embodiment is merely illustrative of the application. Other embodiments may be readily devised by those skilled in the art which will embody the principles of the invention and fall within the spirit and scope thereof.

We claim:

1. A method of producing a splash-proof, thin plastic, disposable, press-on, drink-cup lid that features a pre-tensioned, one-way valve with a U-shaped, under-lapping flange, comprising the steps of:
providing a plastic sheet with a material thickness in the range of 0.15-0.35 inches;
creating a basic lid part by heating and sucking said sheet down into a first lid mold;
removing a resultant molded sheet from said first mold;
cooling said resultant molded sheet;
providing a steel-ruled first die in a first base tool;
positioning said molded sheet on said first base tool;
stamping said molded sheet on said first die in said first base tool cutting a lid perimeter as well as a tongue-shaped valve within said lid perimeter, wherein said valve is cantilevered at a valve rear from a lid raised planar central platform out to a valve tip near to a lid rim, said valve being separated from its surround by a contoured shaped depression which is die cut along an outside valve perimeter base, said valve having substantially vertical side walls, said valve side walls being created with an L-shaped step adjacent a bottom of an exterior portion of a valve side wall;
providing a second base tool having a coining second die;
positioning the stamped and cut lid on said coining second die in said second base tool;
creating a tongue flange by operating said second base tool to stamp said L-shaped step producing a smooth valve side wall and forcing an excess of plastic material through said die cut resulting in an under-lapping flange between said valve perimeter base and a lid body.

2. The method of claim 1, wherein:
said coining second die compresses downward against the valve base in said depression catching the side wall step, compressing and expanding the step outwardly, creating said under-lapping flange that expands outwardly beyond and under the die cut of the lid body.

3. A method as recited in claim 2, wherein:
said basic lid is formed from polystyrene plastic.

4. A method as recited in claim 3, wherein:
said basic lid part is molded with an upward curve of the lid rim adjacent the valve tip.

5. A method as recited in claim 4, wherein:
said valve is molded to be higher than a substantial portion of the lid raised planar central platform.

6. A method as recited in claim 5, wherein:
said upward curve is in the range of 2 to 3 degrees.

* * * * *